(12) United States Patent
Herring et al.

(10) Patent No.: US 8,515,824 B2
(45) Date of Patent: Aug. 20, 2013

(54) NEGOTIATION OF PRODUCT PURCHASE WITH AN ELECTRONIC DEVICE

(75) Inventors: Dean F. Herring, Youngsville, NC (US); Brad M. Johnson, Raleigh, NC (US); Adrian X. Rodriguez, Durham, NC (US); Jeffrey J. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 13/281,547

(22) Filed: Oct. 26, 2011

(65) Prior Publication Data

US 2013/0110652 A1 May 2, 2013

(51) Int. Cl.
*G06Q 30/00* (2012.01)
*G06Q 20/00* (2012.01)

(52) U.S. Cl.
USPC ............... 705/26.4; 705/16; 705/20; 705/22

(58) Field of Classification Search
USPC ...................... 705/26.4, 16, 20, 22
See application file for complete search history.

(56) References Cited

U.S. PATENT DOCUMENTS

| | | | |
|---|---|---|---|
| 6,865,545 B1* | 3/2005 | Epstein et al. ............ | 705/14.26 |
| 7,860,776 B1 | 12/2010 | Chin et al. | |
| 7,917,405 B2 | 3/2011 | Bonner et al. | |
| 8,108,262 B1* | 1/2012 | Thirumalai et al. ......... | 705/26.1 |
| 8,285,597 B1* | 10/2012 | Thirumalai et al. ......... | 705/26.1 |
| 2003/0004821 A1 | 1/2003 | Dutta et al. | |
| 2003/0033216 A1 | 2/2003 | Benshemesh | |
| 2008/0011844 A1* | 1/2008 | Tami et al. .................... | 235/385 |
| 2008/0114678 A1* | 5/2008 | Bennett et al. ................. | 705/44 |
| 2008/0126196 A1* | 5/2008 | Perdomo et al. ............... | 705/14 |
| 2009/0112733 A1 | 4/2009 | Horowitz | |
| 2009/0171853 A1 | 7/2009 | Georgiou et al. | |
| 2009/0222337 A1* | 9/2009 | Sergiades ......................... | 705/14 |
| 2010/0280912 A1* | 11/2010 | Gopalpur et al. ............... | 705/22 |
| 2011/0040692 A1* | 2/2011 | Ahroon ......................... | 705/307 |
| 2011/0054992 A1 | 3/2011 | Liberty et al. | |
| 2012/0022965 A1* | 1/2012 | Seergy ......................... | 705/26.4 |

OTHER PUBLICATIONS

Neelakantan, Jayasankar. (Sep. 1, 2005). Strategies for clearance-markdown optimization in the retail industry. The State University of New York at Buffalo, Department of Industrial Engineering. Retrieved by ProQuest on Mar. 27, 2013.*

* cited by examiner

*Primary Examiner* — Scott Zare
(74) *Attorney, Agent, or Firm* — Olive Law Group, PLLC; Thomas E. Tyson

(57) ABSTRACT

In accordance with one or more embodiments of the present invention, methods and systems disclosed herein provide for negotiating product purchase with an electronic device. An example method includes acquiring product data from a product. The method also includes determining purchase offer information based on the product data. Further, the method includes negotiating purchase of the product based on the purchase offer information.

20 Claims, 5 Drawing Sheets

NEGOTIATION OF PRODUCT PURCHASE WITH AN ELECTRONIC DEVICE

BACKGROUND

1. Field of the Invention

The present invention relates to transactions, and more specifically, to using electronic devices for negotiating purchase of products.

2. Description of Related Art

In retail environments, such as grocery stores and other "brick and mortar" stores, many products are available for sale to consumers at various prices. Over time, it becomes desirable for retailers to sale certain products. For example, perishable food products, such as meat and milk, have an expected shelf life or expiration date after which the product cannot be sold. As the expiration date approaches, discounts may be applied to such products to further motivate consumers to purchase the products. Retailers may also be motivated to reduce the price or add some other value to products such as clothing products, which are seasonal.

Oftentimes, retailers will re-price products or advertise discounts on products that the retailers are interested in quickly selling. However, product re-pricing and advertising can be time consuming and expensive to a retailer. For at least these reasons, there is a need for improved techniques for setting prices at which consumers will purchase products.

BRIEF SUMMARY

In accordance with one or more embodiments of the present invention, methods and systems disclosed herein provide for negotiating product purchase with an electronic device. An example method includes acquiring product data from a product. The method also includes determining purchase offer information based on the product data. Further, the method includes negotiating purchase of the product based on the purchase offer information.

In accordance with embodiments of the present invention, a method may include receiving purchase offer information for a product from an electronic device. The method may also include negotiating purchase of the product via communication with the electronic device. Further, the method may include conducting a transaction for purchase of the product at a transaction terminal based on the negotiation.

DETAILED DESCRIPTION

Figure 1:
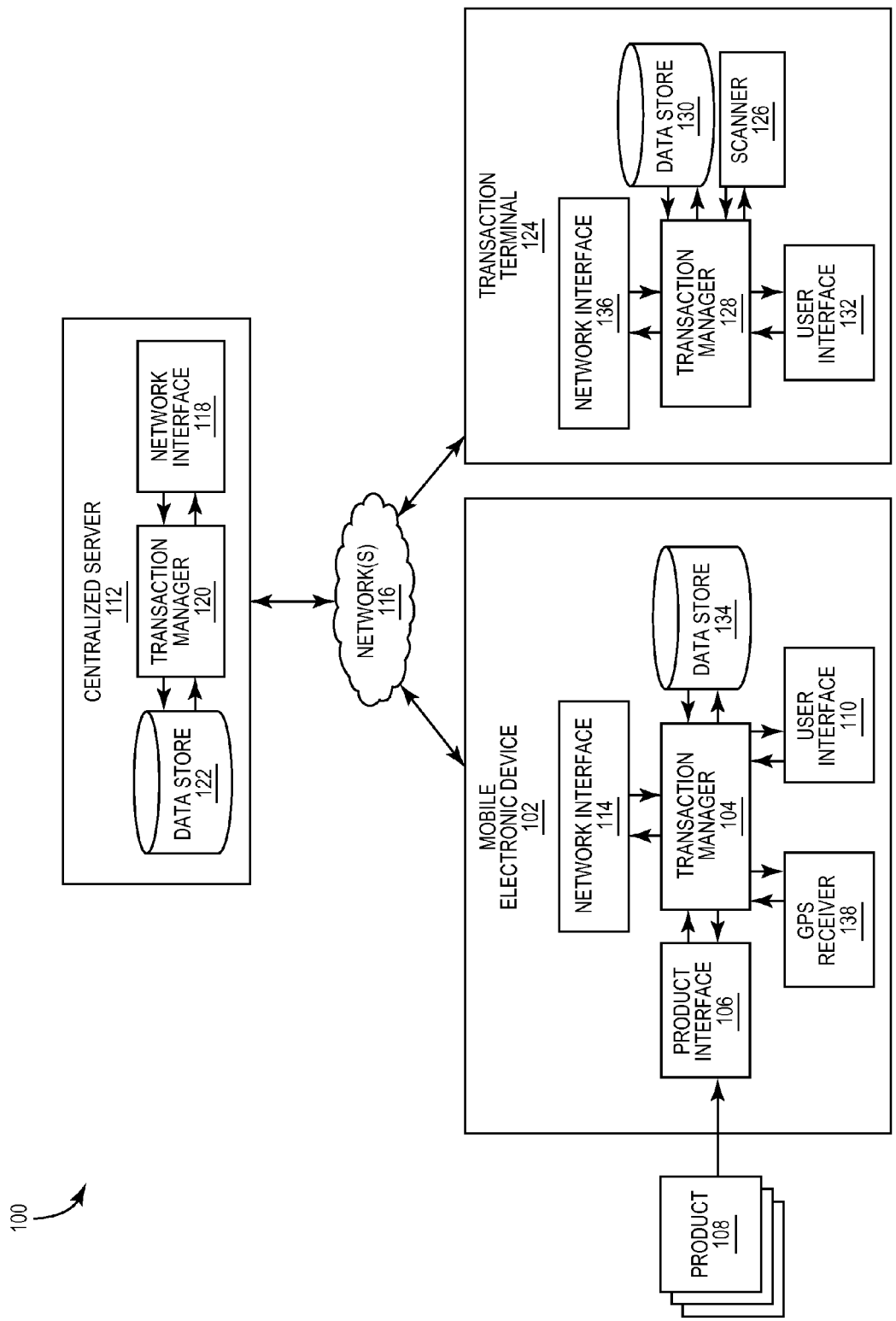
FIG. 1 is a block diagram of a purchase negotiation and transaction system 100 according to embodiments of the present invention.

Exemplary systems and methods for negotiating purchase of products in accordance with embodiments of the present invention are disclosed herein. Particularly, disclosed herein is a purchase negotiation and transaction system configured to assist a user or customer with negotiating the purchase of one or more products. In an example, the system may be implemented in a retail environment or a "brick and mortar" store having a variety of products for browse and purchase by a customer. In an example, the customer may carry a mobile electronic device, such as a smart phone, within the retail environment for use in acquiring product data from one or more of the products. Example product data may include, but is not limited to, an expiration date associated with the product, electronic product code (EPC) information from the product, radio frequency identification (RFID) information from the product, and condition-related information from the product. Subsequent to acquisition of the product data of a product, the mobile electronic device may determine purchase offer information based on the product data. For example, the mobile electronic device may be controlled by the customer to capture an electronic product code (EPC) (e.g., uniform product code (UPC) or quick response (QR) code) printed on a product label or packaging. In this example, the mobile electronic device may communicate the EPC image or product information determined based on the EPC image to a server within the retail environment. Such communication between the mobile electronic device and the server may initiate negotiation between the customer and retailer for purchase of the product. For example, offers and counteroffers may be exchanged between the mobile electronic device of the customer and a server of the retailer for purchase of the product. The negotiation may result in a lowest price for the product, which may be acceptable or not to the customer. If the price is acceptable, the customer may purchase the product for the negotiated price at a transaction terminal, such as a point of sale (POS) terminal, within the retail environment. The item may also be purchased, for example, via a mobile electronic device.

As referred to herein, the term "electronic device" should be broadly construed. It can include any type of device capable of acquiring product data from a product and capable of interacting with a user. For example, the electronic device may be a smart phone including a camera configured to capture one or more images of a product. In another example, the electronic device may include components configured to read, scan, or otherwise determine an identifier (e.g., a UPC on a product) of a product. The electronic device may be a mobile electronic device such as, for example, but not limited to, a smart phone, a cell phone, a pager, a personal digital assistant (PDA, e.g., with GPRS NIC), a mobile computer with a smart phone client, or the like. An electronic device can also include any type of conventional computer, for example, a laptop computer or a tablet computer. A typical mobile electronic device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phone, the examples may similarly be implemented on any suitable electronic device, such as a computer.

As referred to herein, the term "user interface" is generally a system by which users interact with an electronic device. A user interface can include an input for allowing users to manipulate an electronic device, and can include an output for allowing the electronic device to present information and/or data, indicate the effects of the user's manipulation, etc. An example of a user interface on an electronic device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of an electronic device for interaction. The display object can be displayed on a display screen of an electronic device and can be selected by and interacted with by a user using the user interface. In an example, the display of the electronic device can be a touch screen, which can display the display icon. The user can depress the area of the display screen where the display icon is displayed for selecting the display icon. In another example, the user can use any other suitable user interface of an electronic device, such as a keypad, to select the display icon or display object. For example, the user can use a track ball or arrow keys for moving a cursor to highlight and select the display object.

As referred to herein, the term "product data" may be any type of data that may be acquired from a product. As an example product data may include an expiration date associated with the product. In this example, the product may be a perishable product such as, but not limited to, a food, drink, chemical, and battery having a particular shelf life. Such expiration date information may be read directly from a product or may be determined based on an identifier associated with the product. In another example, product data may include EPC information that provides a unique identity for each type of product. In this example, the EPC information may be obtained by scanning coded information from a product including, but not limited to, information encoded in a UPC or RFID tag affixed to the product or packaging of the product. In yet another example, product data may include condition-related information that may be acquired from a product. Condition-related information may include, but is not limited to, data that indicates a condition of a product, such as, indications whether a product is damaged, spoiled, unusable, or otherwise less usable than a better conditioned product of the same type. In this example, an image captured of a product may indicate that the product is damaged or packaging of the product is damaged. An electronic device in accordance with embodiments of the present invention may acquire product data for use in negotiating purchase of the product.

The presently disclosed invention is now described in more detail. For example, FIG. 1 illustrates a block diagram of a purchase negotiation and transaction system 100 according to embodiments of the present invention. The system 100 may be implemented in whole or in part in any suitable purchase environment for conducting purchase transactions. For example, the system 100 may be implemented in a retail store having a variety of products and one or more point of sale terminals. Referring to FIG. 1, the system 100 may include a mobile electronic device 102 having a transaction manager 104 configured to acquire product data from one or more products, to determine purchase offer information based on the product data, and to negotiate purchase of the product based on the purchase offer information. More particularly, for example, the electronic device 102 may include a product interface 106 configured to acquire product data from a product 108. For example, product data may include, but is not limited to, an expiration date associated with the product, electronic product code (EPC) information from the product, radio frequency identification (RFID) information from the product, and condition-related information from the product, and combinations thereof. In an example, the product interface 106 may be a camera and/or scanner configured to acquire product data from the product 108. In an example, the product may be function as a bidding interface such that the product provides functionality for interaction for negotiating its price.

According to embodiments of the present invention, a user of the electronic device 102 may use an application (often referred to as an "app") residing on the electronic device 102 to interact with the transaction manager 104 via a user interface 110 for implementing the functions according to embodiments of the present invention. The application may reside on the electronic device 102 and may be part of the transaction manager 104. The user may, for example, input commands into the user interface 110 for controlling the product interface 106 to acquire product data of the product 108 and/or other products within a retail environment. The user may also, for example, position the electronic device 102 relative to the product 108 such that the product interface 106 can acquire the product data. Further, for example and as disclosed in more detail herein, the user may input commands into the user interface 110 for negotiating purchase of the product with a retailer. The application may have been downloaded from a web server and installed on the electronic device 102 in any suitable manner. The application may be downloaded to another machine and then transferred to the electronic device. In an example, the application can enable the electronic device 102 with one or more of the features according to embodiments of the present invention.

The transaction manager 104 may control the product interface 106 to acquire the product data from the product 108. For example, a user may position the electronic device 102 relative to the product 102 such that a camera of the electronic device 102 can capture an image of a portion or all of the product 102. The captured image may include, for example, a label identifying the product and/or features of the product, such as a shape and/or color, that can be analyzed to identify the product. In response to capture of the image, the transaction manager 104 may control a display of the user interface 110 to display the image. Further, the transaction manager 104 may control the user interface 110 to present an interface for the user to input an offer price for the product 108 and/or to communicate a request to the retailer for an offer price for the product 108. Various other purchase offer information may be determined based on the product data as disclosed herein. The offer price and the image or other data identifying the product 108 may be communicated to, for example, a centralized server 112 located within or remote from the retail environment. In an example, the transaction manager 104 may control a network interface 114 of the electronic device 102 to communicate the offer price and the image or other product data to the server 112 via one or more communications networks 116. The communications networks 116 may include communication technology such as near field communication (NFC) technology, radio frequency identification (RFID) technology, and BLUETOOTH® technology.

In an example, the product interface 106 may be configured to read a machine-readable image representing data from the product 108. For example, the product interface 106 may be positioned over a barcode (e.g., a UPC, QR code, or any other machine-readable image) on the product 108. The read product data may include information for identifying the product 108 or for providing other information about the product 108.

Communication between the electronic device 102 and the server 112 may be implemented via any suitable technique and any suitable communications network. For example, the electronic device 102 and the server 112 may interface with one another to communicate or share data over a suitable communications network, such as, but not limited to, the Internet, a local area network (LAN), or a wireless network, such as a cellular network. As an example, the electronic device 102 and the server 112 may communicate with one another via a WI-FI® connection or via a web-based application.

Continuing the example of an electronic device capturing an image of a product, a network interface 118 of the server 112 may receive the offer price and the image from the network(s) 116. In response to receipt of the offer price and the image, a transaction manager 120 of the server 112 may use the image to identify the product. The transaction manager 120 may also determine whether to accept the offer price for the identified product, or to propose a counteroffer price to the customer. The transaction manager 120 may make this determination based on one or more factors such as, but not limited to, store inventory of the product or related products, quality of the product, supply and demand information, time of day, season, number of previous bids on the product, number of other customers within an area where they may purchase the product, a store environment (e.g., temperature), proximity to store employees to aid in a sale, or expiration information. Such information may be obtained based on the image of the product or information stored in a data store 122 of the server 112 or another data store accessible by the server 112. Subsequent to determining whether to accept the offer price or to propose a counteroffer price, the transaction manager 120 may control the network interface 118 to communicate to the electronic device 102 either notification of acceptance of the offer price or the proposed counteroffer price. Such a negotiation of the purchase of the product 108 may continue with one or more additional counteroffers until a purchase price is settled on by the customer and the retailer. One or both of the electronic device 102 and the server 112 may store a record for indicating the agreed upon purchase price for the product 108. Alternatively, acceptance of offers may be declined by either the customer or retailer such that a purchase price is not agreed upon.

In an example, once a price for a product is negotiated, the negotiation may end when a customer returns the product to its place in the store. If the customer decides to place an item back in its place after being in a check-out line, a new negotiation may begin in an effort to urge the customer to not return the product. This new negotiation may include providing payment information. For example, payment information may indicate that the customer has only $20.00 of available credit and $21.00 worth of products in his or her cart. The negotiation may use such information indicating a deficiency in the customer's available credit to purchase the items to reduce one or more of the products in the cart by the deficiency amount. In this example, the price of one or more of the items may be reduced by $1.00 in total.

The transaction manager 120 may be implemented by hardware, software, firmware, of combinations thereof. For example, software residing on the data store 122 may include instructions implemented by a processor for carrying out functions of the transaction manager 120 disclosed herein.

Subsequent to establishing a purchase price for the product 108, the customer may proceed to a transaction terminal 124, such as a POS terminal, for purchase of the product 108 and one or more other products. The customer may use the electronic device 102 for conducting a transaction for purchase of the product 108 based on the negotiation of the purchase price between the customer and the retailer. For example, the electronic device 102 may communicate to the transaction terminal 102 information identifying the customer. The information identifying the customer may be used to determine that the customer is associated with the negotiated purchase price for the product 108. The transaction terminal 102 may use the negotiated price for conducting the transaction for purchase of the product 108 by the customer.

The transaction terminal 124 may include a scanner 126 configured to read a machine-readable image representing data from a product, such as the product 108. The scanner 126 may be a handheld device that can be passed over a barcode (e.g., a UPC or any other machine-readable image) on the product 108 or may be built into a counter or platform whereby products are passed over the scanner 126. Further, the scanner 126 may read data from products and transmit the data to a transaction manager 128 residing on the transaction terminal 124 via, for example, a wireless or wireline connection. In an example, the machine-readable image on the product 108 may represent identification of the product. Identification of the product 108 may alternatively be provided to the transaction terminal 124 by, for example, a user entering an identifier, such as a number, representing the product 108. The transaction manager 128 may use the product identifier for conducting a transaction for purchase of the product 108 at the transaction terminal 124 based on a negotiation between the customer and the retailer in accordance with embodiments of the present invention. The product identifier may be stored in a suitable memory, such as a data store 130 of the transaction terminal 124.

The transaction terminal 124 may include a user interface 132 for interaction with a customer, such as the user of the electronic device 102. The user interface 132 may include a keyboard device that enables the customer to input account and payment information for processing by the transaction terminal 124. The customer may also enter a user identifier, or the user identifier for the customer may be identified by the input account information. The user interface 132 may include a scanning device for reading a customer's financial card (e.g., credit card or debit card) including account number. The keypad device may enable a shopper to enter a personal identification number (PIN) if using a debit card. The user interface 132 may include a display for displaying purchase and transaction information to the customer. For example, the user interface 132 may be a touchscreen display for displaying text and graphics and for receiving user input.

The user interface 132 may be communicatively coupled to the transaction terminal 124 via wireless or wireline elements.

The transaction terminal 124 may also include a product detection device, such as, but not limited to, a scale, sensor, or other instrument that captures information relating to products. In an example, the product detection device may detect the presence of a product at a bagging area. Further, for example, the product detection device may capture weight, dimension, color, and/or other measurements of products. The transaction terminal 124 may use this information for identifying the product.

Figure 2:
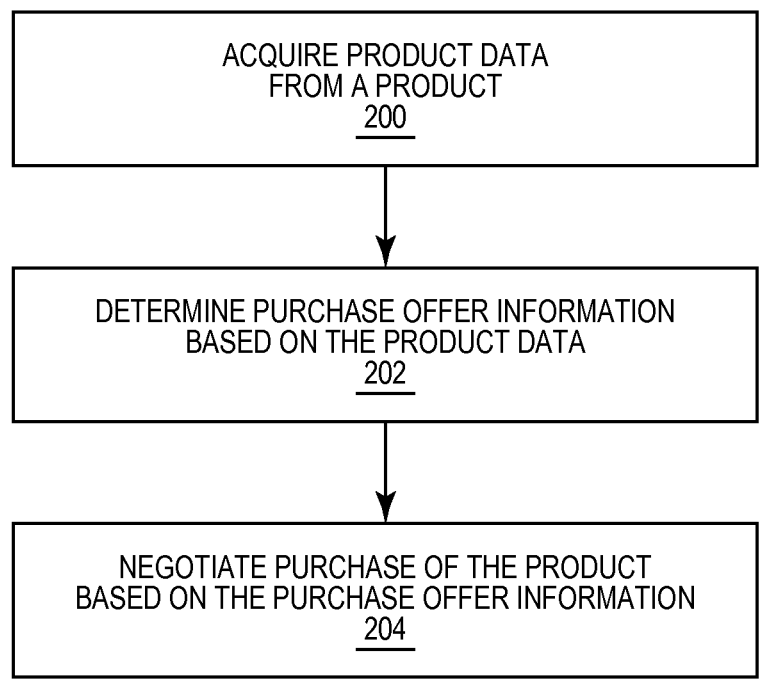
FIG. 2 is a flowchart of a method for negotiating purchase of a product with an electronic device in accordance with embodiments of the present invention.

In accordance with embodiments of the present invention, the transaction manager 104 of the electronic device 102 is configured to acquire product data from a product, to determine purchase offer information based on the product data, and to negotiate purchase of the product based on the purchase offer information. In an example, FIG. 2 illustrates a flowchart of a method for negotiating purchase of a product with an electronic device in accordance with embodiments of the present invention. The method of FIG. 2 is described as being implemented by the electronic device 102 shown in FIG. 1, although the method may be implemented by any suitable system. The method may be implemented by hardware, software, and/or firmware of the electronic device 102 and/or another electronic device.

Referring to FIG. 2, the method includes acquiring 200 product data from a product. For example, the electronic device 102 may acquire one or more of an expiration date of the product 108, EPC information from the product 108, RFID information from the product 108, condition-related information from the product 108, and one or more images of all or a portion of the product 108. The transaction manager 104 may control the product interface 106 to acquire product data from the product 108. For example, the product interface 106 may include a camera that is controlled by the transaction manager 104 to capture an image of a barcode printed on packaging of the product 108.

In another example of acquiring product data, the transaction manager 104 may control a camera of the product interface 106 to capture an image of text printed on the product 108 or packaging of the product 108. In this example, the transaction manager 104 may analyze the captured image of the text and apply optical character recognition (OCR) processing to text in the captured image for use in identifying the product 108 or other information about the product 108. For example, the text may be an expiration date for the product 108. In another example, the text may include a name of the product 108.

In another example of acquiring product data, the transaction manager 104 may control a camera of the product interface 106 to capture an image of a damaged portion of the product 108. For example, the product 108 may be a can having a crushed portion. In another example, the product 108 may be contained in packaging that is damaged or otherwise broken. The transaction manager 104 may analyze the captured image for determining a condition of the product 108. Example condition indicators include, but are not limited to, damaged and undamaged. Further, for example, the transaction manager 104 may determine a level of damage of the product 108.

The method of FIG. 2 includes determining 202 purchase offer information based on the product data. For example, the transaction manager 104 may control the user interface 110 to present (e.g., display) information about the product 108 such as, but not limited to, an identifier of the product, a captured image of the product 108, or an expiration date of the product 108. Further, the transaction manager 104 may control the user interface 110 to provide an interface with which the customer may enter an offer price for the product 108. For example, the user interface 110 may include a touchscreen display that displays an area for receipt of the offer price via user input. The transaction manager 104 may control the network interface 114 to communicate the offer price to the server 112.

In another example of determining purchase offer information, the transaction manager 104 may control the network interface 114 to communicate the product data to another electronic device for requesting an offer price for the product 108. For example, an image of the product 108 or EPC information may be communicated to the server 112. The transaction manager 120 of the server 112 may determine an offer price for the product 108 based on the product data, and may control the network interface 118 to communicate the offer price to the electronic device 102. In an example, the transaction manager 120 may determine a condition of the product 108 based on a captured image and may determine an offer price based on the determined condition.

The method of FIG. 2 includes negotiating 204 purchase of the product based on the purchase offer information. For example, the electronic device 102 may receive a counteroffer price from the server 112 in response to communication of an offer price to the server 112. The transaction manager 104 may control the user interface 110 (e.g., a display of the user interface) to present the counteroffer to the customer. The customer may interact with the user interface 110 to accept the counteroffer price, decline the counteroffer price, or enter another offer price for communication to the server 112. Such a negotiation for purchase of the product 108 may continue until a price for purchase of the product 108 is settled upon, or a price is not settled upon and thus the negotiation ends. In response to acceptance of a price by both the customer and the retailer, the server 112 and/or electronic device 102 may store a record of the agreed-upon price and an identifier of the product. Subsequently, the stored record may be accessed by a transaction terminal, such as the transaction terminal 124, for use in conducting a transaction for purchase of the product 108. It is noted that a customer can later decide to return an item to its previous location, such as a shelf, to end a negotiation. The customer may end a negotiation at any time up until purchase of the item at a point of sale location, such as a cash register.

In another example of negotiating purchase of a product, the initial offer price for the product 108 may be generated at the server 112 or another electronic device in response to receipt of identification of the product 108 or product data from the electronic device 102. In this example, the server 112 may communicate the initial offer price to the electronic device 102. Negotiation of the price may continue between the server 112 and the electronic device 102 until a price is agreed upon or not as described herein. The agreed-upon price may be subsequently used for conducting a transaction for purchase of the product 108. Further, the agreed-upon price may be linked to the customer and one or more other customers. A negotiation may involve a minimum number of customers needed to purchase a product at a particular reduced price in order for each of the customers to receive the product at the reduced price.

Figure 3:
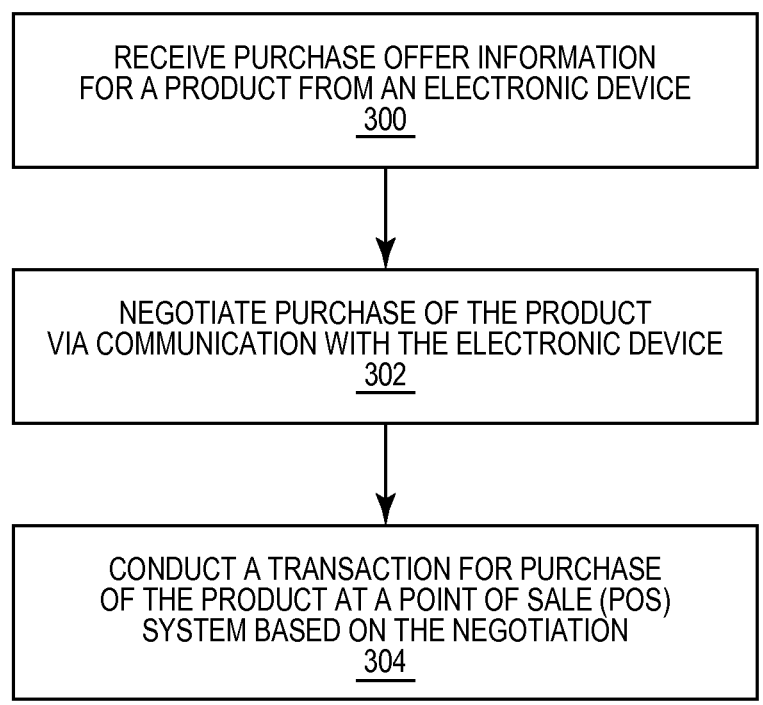
FIG. 3 is a flowchart of a method for negotiating purchase of a product with an electronic device in accordance with embodiments of the present invention.

In accordance with embodiments of the present invention, one or more electronic devices are configured to receive purchase offer information for a product from another electronic device, to negotiate purchase of the product via communication with the other electronic device, and to conduct a transaction for purchase of the product at a point of sale (POS)

system based on the negotiation. In an example, FIG. 3 illustrates a flowchart of a method for negotiating purchase of a product with an electronic device in accordance with embodiments of the present invention. The method of FIG. 3 is described as being implemented by the system 100 shown in FIG. 1, although the method may be implemented by any suitable system. The method may be implemented by hardware, software, and/or firmware of the server 112 and/or another electronic device, such as the transaction terminal 124.

Referring to FIG. 3, the method includes receiving 300 purchase offer information for a product from an electronic device. For example, the server 112 may receive purchase offer information from the electronic device 102. The purchase offer information may include, for example, product data such as an image of the product 108. Other examples of purchase offer information include an expiration date associated with the product 108, EPC information, RFID information, and condition-related information. The transaction manager 120 may identify the product 108 based on the purchase offer information and determine that a customer using the electronic device 102 is requesting an offer for the product 108. The transaction manager 120 may use the purchase offer information for determining an offer price for the customer to purchase the product 108. In another example, the purchase offer information received from the electronic device 102 may include an offer price for the product 108.

The method of FIG. 3 includes negotiating 302 purchase of the product via communication with the electronic device. As described in examples disclosed herein, offer prices may be exchanged between the server 112 and the electronic device 102 until a price for the product 108 is agreed upon or not. In response to acceptance of a price by both the customer and the retailer, the server 112 and/or electronic device 102 may store a record of the agreed-upon price and an identifier of the product. For example, the transaction server 120 of the server 112 may store the agreed-upon price in the data store 122. In another example, the transaction manager 104 of the electronic device 102 may store the agreed-upon price in a data store 134.

The method of FIG. 3 includes conducting 304 a transaction for purchase of the product at a transaction terminal based on the negotiation. For example, a purchase transaction may be initiated between the retailer and the customer using the electronic device 102. The purchase transaction may be implemented by use of the transaction terminal 124. The customer may interact with the transaction terminal 124 for identifying the customer. For example, the customer may be identified based on scanning of the customer's financial card. Identification of the customer may be used for accessing data indicating the agreed-upon price for the product 108. For example, the electronic device 102 may communicate the price to the transaction terminal via the network 116. In another example, the transaction manager 128 of the transaction terminal 124 may control a network interface 136 to communicate to the server 112 a request for an agreed-upon price for the product 108 for the customer. In this example, the transaction manager 120 may perform a lookup in the data store 122 based on an identifier for the customer and the identified product for finding the agreed-upon price. The transaction manager 120 may then control the network interface 118 to communicate the price to the transaction terminal 124. The transaction terminal 124 may then use the price for conducting a transaction for purchase of the product 108.

In another example, the step of conducting a transaction for purchase of a product may occur in real time on an electronic device without the need of a POS. For example, the sale may be finalized via a web-based transaction. By conducting the sale in this manner, the customer may be eligible for a greater discount in part because further negotiation on the product is stopped.

Figure 4A:
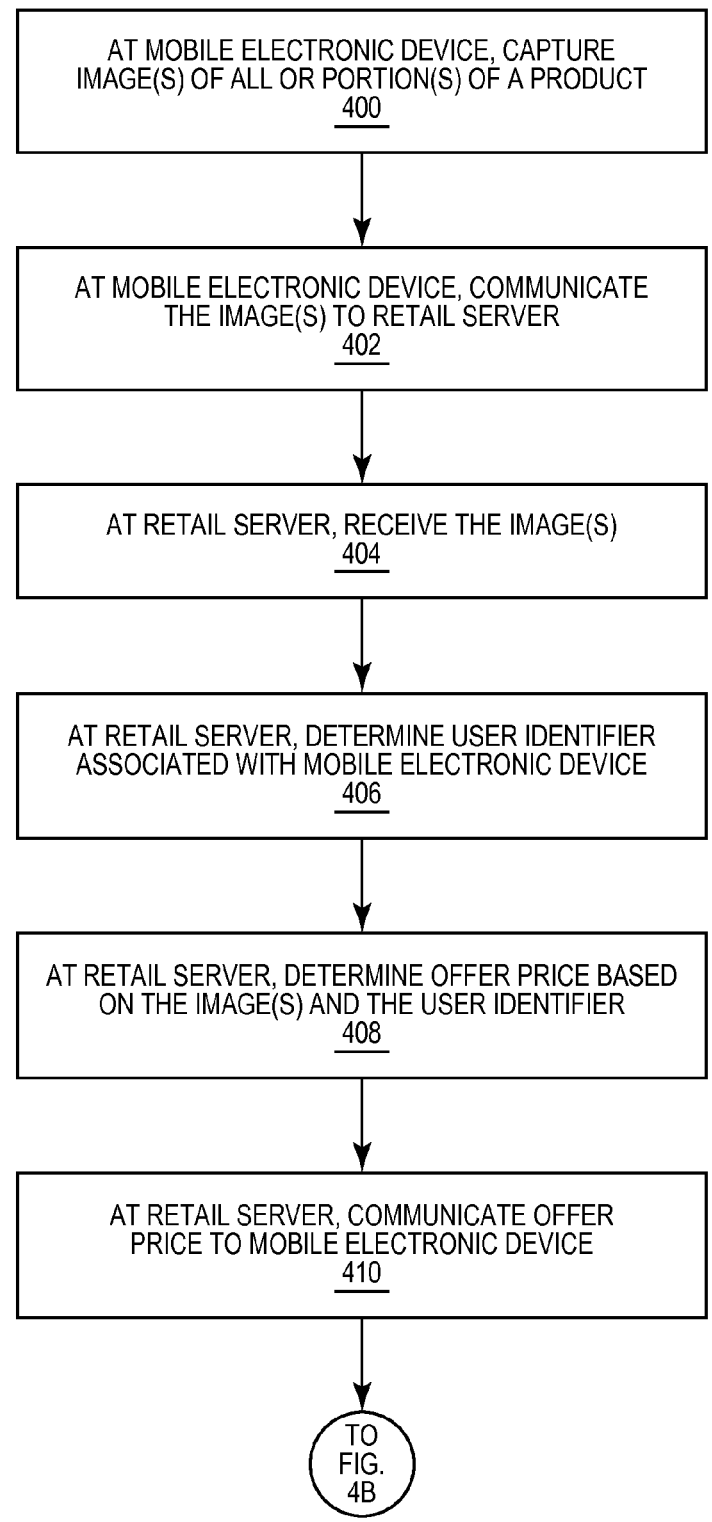
FIGS. 4A and 4B illustrate a flowchart of a method for negotiating purchase of a product with an electronic device in accordance with embodiments of the present invention.
Figure 4B:
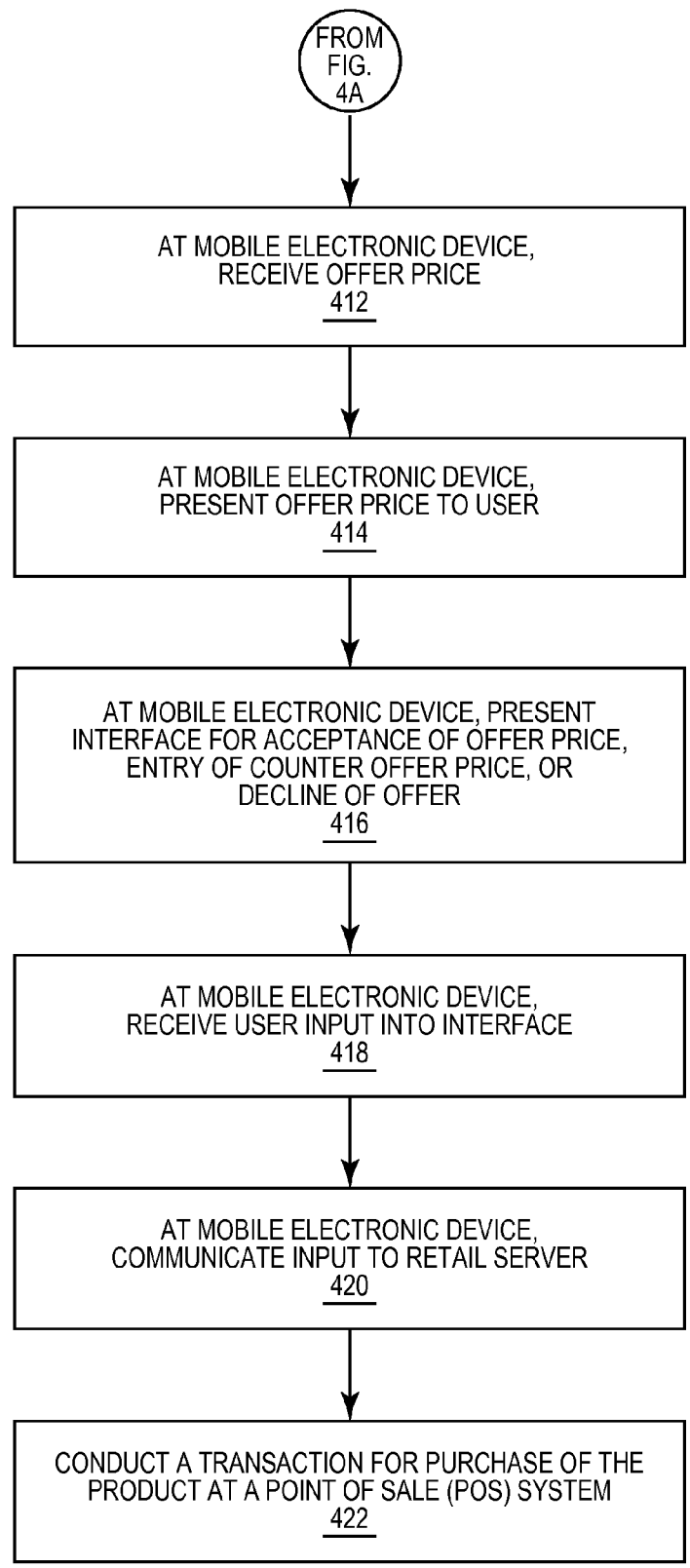

FIGS. 4A and 4B illustrate a flowchart of a method for negotiating purchase of a product with an electronic device in accordance with embodiments of the present invention. The method of FIGS. 4A and 4B is described as being implemented by the system 100 shown in FIG. 1, although the method may be implemented by any suitable system. The method may be implemented by hardware, software, and/or firmware of the electronic device 102, the server 112, and the transaction terminal 124, and/or one or more other electronic devices.

Referring to FIG. 4A, the method includes capturing 400 one or more images of all or one or more portions of a product at a mobile electronic device. For example, a camera of the electronic device 102 may be positioned for capture of an image of the product 108. The image may be stored in the data store 134.

The method of FIGS. 4A and 4B includes communicating 402 the captured image(s) to a retail server. For example, the transaction manager 104 of the electronic device 102 may generate a message including the captured image and may communicate the message to the server 112. The message may be communicated via the network 116. The message may also include information identifying the user or customer using the electronic device 102, such as a customer identification number.

The method of FIGS. 4A and 4B includes receiving 404 the image(s) at the retail server. For example, the network interface 118 of the server 112 may receive the message including the captured image. The network interface 118 may also receive the customer identification number.

The method of FIGS. 4A and 4B includes determining 406 a user identifier associated with the mobile electronic device. For example, the transaction manager 120 may access information in the received message from the electronic device 102 for identifying the customer.

The method of FIGS. 4A and 4B includes determining 408 an offer price based on the image(s) and the user identifier. For example, the transaction manager 120 may determine an offer price for the product 108 based on one or more factors such as, but not limited to, store inventory of the product or related products, quality of the product, supply and demand information, time of day, season, or expiration information. In an example, the transaction manager 120 may determine that there is a high number of the same type of product in inventory. In this example, the transaction manager 120 may determine to set the offer price for the product 108 to be the same as the current price for the product. In contrast, in response to determining that there is a low number of the same type of product in inventory, the offer price may be set lower than the current price for the product. Further, for example, the offer price may be reduced from the current price if the image indicates that the product 108 has been damaged. In another example, the price may be reduced in response to determining that there is a high demand for the product or a low supply of the product. The offer price may also be set based on the time of day, season, or expiration information.

The method of FIGS. 4A and 4B includes communicating 410 the offer price to the mobile electronic device. For example, the transaction manager 120 of the server 112 may control the network interface 118 to communicate the offer price to the electronic device 102. The method of FIGS. 4A and 4B includes receiving 412 the offer price at the electronic device. For example, the network interface 114 of the electronic device 102 may receive the offer price for processing by the transaction terminal 104.

The method of FIGS. 4A and 4B includes presenting 414 the offer price to the user. For example, the transaction manager 104 may control the user interface 110 to present the offer price to the customer. For example, the amount of the offer price may be presented within a display window of a display. The transaction manager may reside on a centralized server, within a store shelf, on a mobile electronic device, or within an item or product.

The method of FIGS. 4A and 4B also includes presenting 416 an interface for acceptance of the offer price, entry of a counter offer price, or decline of the offer. For example, the transaction manager 104 may control the user interface 110 to present an interface for receiving user input for selecting to accept the offer price, enter a counter offer price, or decline the offer. Subsequently, the method includes receiving 418 user input for selecting to accept the offer price, enter a counter offer price, or decline the offer.

The method of FIGS. 4A and 4B includes communicating 420 the input to the retail server. For example, the transaction manager 104 may control the network interface 114 to communicate the selection to the server 112. Negotiation of the price may be conducted between the electronic device 102 and the server 112 in accordance with embodiments of the present invention.

The method also includes conducting 422 a transaction for purchase of the product at a point of sale (POS) system. For example, a settled price for the product 108 may be communicated to the transaction terminal 124 in response to initiation of a purchase transaction of the customer at the transaction terminal 124. The transaction terminal 124 may use the price for checking out the customer for purchase of the product 108 in accordance with embodiments of the present invention.

In accordance with embodiments of the present invention, supplemental data may be used for determining an offer price for a product. For example, supplemental data may be determined based on product data acquired from the product. Example supplemental data may include, but is not limited to, discount information associated with the product, purchase information associated with the product, position coordinates of the product, and the like. This information either alone or in combination with each other may be used, for example, by the transaction manager 120 for determining an offer price for the product 108.

In an example, discount information for a product may be determined by the server 112 based on information stored in the data store 122. The data store 122 may include a table indicating discounts for one or more products available for sale in a retail environment. In response to receipt of information for identifying a product, the transaction manager 120 may lookup discount information, if any, for the identified product. If a discount is available for the product, the discount may be applied for setting an offer price for the identified product.

In another example, purchase information associated with a product may be determined by the server 112 based on information stored in the data store 122. Purchase information may include, for example, any information that may be used in determining an offer price for a product. For example, purchase information may be determined based on customer and transaction information such as, a customer profile and purchases by the customer. A reduction in the offer price for a product may be applied based on the purchase information. Example customer and transaction information includes, but is not limited to, customer profile information, transaction security information, payment information, purchase item information, and the like.

In another example of supplemental data, position coordinates of a product may be used for determining purchase offer information. In an example, the mobile electronic device 102 may include a global positioning system (GPS) receiver 138 capable of receiving signals transmitted by GPS satellites for determining position coordinates of the electronic device 102. The position coordinates may indicate a location of the product 108 within a retail environment. The transaction manager 104 of the electronic device 102 and/or the transaction manager 120 of the server 112 may use the position coordinates for setting an offer price for the product 108. Position coordinates may also be used for determining or validating a product that is being negotiated.

Embodiments in accordance with the presently disclosed invention provide for dynamic re-pricing of products in a retail environment. The updated price may be set as an offer price for a product in accordance with embodiments of the present invention. Re-pricing may be based on inventory, supply parameters, a customer's willingness to purchase the product now or later at a POS, based on a method of payment (e.g., store card, debit card, and check card) and/or various other factors and conditions as disclosed herein. Further, customers may send offers and counteroffers for purchase of products as disclosed herein. In this way, a customer may bid on products, and a retailer's server or other electronic device of the retailer may determine whether to accept the bid, decline the bid, or counteroffer.

In an example, a price of a product may be automatically reduced as a shelf life of the product becomes shorter. A price of the product may be similarly adjusted as the inventory count for the product becomes lower. In an example, as products are placed on a shelf or stocked in a store, the price may be set at a number. In this example, the initial price may be automatically reduced over time.

In accordance with other embodiments of the present invention, multiple customers may group bid on one or more products to influence the sale price at the time of a customer's initial negotiation. The price allowed by the retailer for purchase of a product may be further reduced if a higher number of customers are bidding on the product.

In accordance with other embodiments of the present invention, a price of products that are complementary or related to a product may be increased. For example, the price of a soft drink of one type may be raised if the inventory of another type of soft drink is low. Further, for example, products at a discounted price may be offered to a customer in response to receipt of an offer for a complementary or related product.

In accordance with other embodiments of the present invention, rather than re-pricing products in the retail environment, the customer may bid or offer a price for a product during checkout. In this example, the customer may see an actual or initial price of the product during check, and then use an electronic device, such as the electronic device 102, to offer a lower price for the product. A price minimum at which the customer can purchase the product may be set based on various factors as disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   using a mobile electronic device comprising at least a processor and memory for:
   capturing product data of a product, the product data comprising information for identifying the product;
   capturing condition-related information of the product, the condition-related information comprising an image of at least a damaged portion of the product;
   receiving an offer price for the product from a user interface of the mobile electronic device;
   communicating the product data, the captured condition-related information, and the received offer price for the product to a server;
   receiving, from the server, purchase offer information, the purchase offer information comprising a counter-offer price for the product, the counter-offer price for the product determined by the server using the product data and the captured condition-related information, wherein the counter-offer price is based on a physical condition of the product; and
   negotiating purchase of the product with the server based on the purchase offer information.

2. The method of claim 1,
   wherein capturing product data comprises acquiring at least one of an expiration date associated with the product, electronic product code (EPC) information from the product, and radio frequency identification (RFID) information from the product from the product.

3. The method of claim 1, further comprising determining supplemental data associated with the product based on the product data, and
   wherein the purchase offer information is determined by the server based on the supplemental data.

4. The method of claim 3, wherein determining supplemental data comprises determining one of discount information associated with the product, purchase information associated with the product, and position coordinates of the product.

5. The method of claim 1, further comprising determining customer and transaction information, and
   wherein the purchase offer information is determined based on the customer and transaction information.

6. The method of claim 5, wherein the customer and transaction information comprises one of customer profile information, transaction security information, payment information, and purchase item information.

7. The method of claim 1, further comprising receiving another offer price for the product from the user interface of the mobile electronic device, and
   wherein negotiating purchase of the product comprises determining purchase of the product based on the other offer price.

8. The method of claim 7, wherein the mobile electronic device is a first electronic device, and
   wherein negotiating purchase of the product comprises receiving a counteroffer via user input into a user interface of a second electronic device.

9. The method of claim 1, wherein negotiating purchase of the product comprises receiving, from the mobile electronic device, one of a counteroffer for purchase of the product and acceptance of the offer price.

10. The method of claim 1, wherein negotiating purchase of the product comprises communicating purchase negotiation information of a customer and a retailer via a wireless communications network.

11. The method of claim 1, further comprising conducting a transaction for purchase of the product based on the negotiation.

12. A method comprising:
    using at least a processor and memory for:
    receiving an offer price, product data, and condition-related information for a product from a mobile electronic device,
       wherein the product data comprises identification data for identifying the product;
       wherein the condition-related information comprises an image of at least a damaged portion of the product; and
       wherein the offer price is based on a physical condition of the product;
    determining a counter-offer price for the product based on the product data and the condition related information, wherein the counter-offer price is based on the physical condition of the product;
    communicating the counter-offer price to the mobile electronic device;
    negotiating purchase of the product via communication with the mobile electronic device; and
    conducting a transaction for purchase of the product at a transaction terminal based on the negotiation.

13. The method of claim 12, wherein receiving product data comprises receiving an expiration date associated with the product, electronic product code (EPC) information from the product, and radio frequency identification (RFID) information from the product.

14. The method of claim 12, further comprising determining one of discount information associated with the product, purchase information associated with the product, and position coordinates of the product, and
    wherein negotiating purchase of the product comprises negotiating purchase of the product based on the one or more of the discount information, purchase information, and the position coordinates.

15. The method of claim 12,
    wherein conducting a transaction comprises conducting purchase of the product with the electronic device based on the offer price.

16. The method of claim 15, wherein negotiating purchase of the product comprises:
    determining the counter-offer price for the product based on the offer price;
    communicating the counter-offer price to the electronic device;
    receiving acceptance of the counter-offer price, and wherein conducting a transaction comprises conducting purchase of the product with the electronic device based on the counter-offer price.

17. The method of claim 12, further comprising:

determining a price for purchase of the product based on the negotiation; and associating the price with the mobile electronic device, and wherein conducting a transaction comprises conducting purchase of the product at the price and at a point-of-sale (POS) system via the mobile electronic device.

18. A mobile electronic device comprising:

a product interface configured to:

capture product data of a product, the product data comprising information for identifying the product; and capture condition-related information of the product, the condition-related information comprising an image of at least a damaged portion of the product; and a transaction manager comprising at least a processor and memory configured to:

receive an offer price for the product from a user interface of the mobile electronic device;

communicate the product data, the captured condition-related information, and the received offer price for the product to a server;

receive, from the server, purchase offer information, the purchase offer information comprising a counter-offer price for the product, the counter-offer price for the product determined by the server using the product data and the captured condition-related information, wherein the counter-offer price is based on a physical condition of the product; and negotiate purchase of the product with the server based on the purchase offer information.

19. A system comprising:

a wireless communications interface configured to receive an offer price, product data, and condition-related information for a product from a mobile electronic device, wherein the product data comprises identification data for identifying the product;

wherein the condition-related information comprises an image of at least a damaged portion of the product; and wherein the offer price is based on a physical condition of the product;

a transaction manager configured to:

determine a counter-offer price for the product based on the product data and the condition related information, wherein the counter-offer price is based on the physical condition of the product;

communicate the counter-offer price to the mobile electronic device;

negotiate purchase of the product via communication with the mobile electronic device; and a transaction terminal configured to conduct a transaction for purchase of the product based on the negotiation.

20. A computer program product for conducting a transaction, the computer program product comprising:

a non-transitory computer readable storage medium having computer readable program code embodied therewith, the computer readable program code comprising:

computer readable code configured to capture product data of a product, the product data comprising information for identifying the product;

computer readable code configured to capture condition-related information of the product, the condition-related information comprising an image of at least a damaged portion of the product;

computer readable code configured to receive an offer price for the product from a user interface of the mobile electronic device;

computer readable code configured to communicate the product data, the captured condition-related information, and the received offer price for the product to a server;

computer readable code configured to receive, from the server, purchase offer information, the purchase offer information comprising a counter-offer price for the product, the counter-offer price for the product determined by the server using the product data and the captured condition-related information, wherein the counter-offer price is based on a physical condition of the product; and computer readable code configured to negotiate purchase of the product with the server based on the purchase offer information.

\* \* \* \* \*